April 24, 1934. W. L. DE BAUFRE 1,956,495
RECTIFIER CONSTRUCTION FOR SEPARATING MIXED FLUIDS
Filed July 1, 1932

INVENTOR.
William Lane De Baufre

Patented Apr. 24, 1934

1,956,495

UNITED STATES PATENT OFFICE

1,956,495

RECTIFIER CONSTRUCTION FOR SEPARATING MIXED FLUIDS

William Lane De Baufre, Lincoln, Nebr.

Application July 1, 1932, Serial No. 620,448

9 Claims. (Cl. 261—114)

This invention relates to improvements in the art of separating mixed fluids and has been applied to the separation of oxygen and nitrogen in atmospheric air. It can be applied to the separation of other fluids, such as the various hydrocarbons found in petroleum.

More specifically, the invention has to do with the construction of a new type of rectifier tray and with the arrangement of these trays within a rectifier.

The primary object of the invention is to increase the purities of the separated fluids, or the purity of one of them thereby increasing the yield of the other.

The foregoing, together with such other objects and advantages as may hereinafter appear or are incident to the invention, are realized by the constructed which I have illustrated in preferred forms in the accompanying drawing, wherein Fig. 1 is a sectional elevation of a rectifying column for separating atmospheric into more or less pure oxygen and nitrogen.

Figure 1:
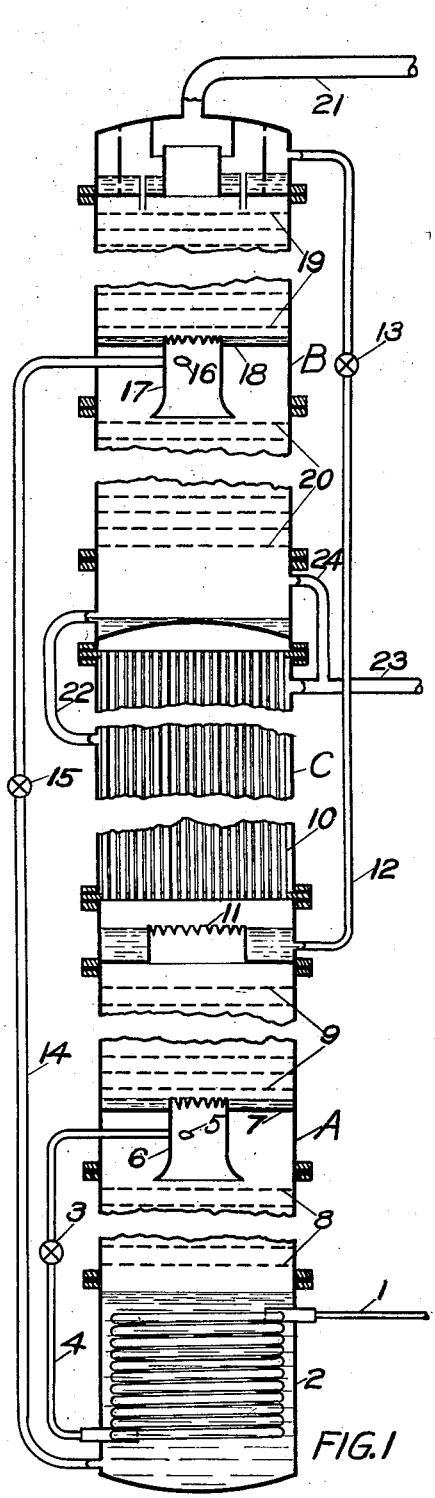

Referring to Fig. 1, the rectifying column for separating atmospheric air into more or less pure oxygen and nitrogen consists of a lower preliminary rectifier A, an upper main rectifier B and an intermediate vaporizer C. The air being rectified is first separated into two portions in the preliminary rectifier A. One portion is nearly pure nitrogen while the other portion is richer in oxygen than the original atmospheric air. These two portions are then introduced into the main rectifier B where the first mentioned portion serves as a reflux fluid for the separation of the other portion into nearly pure oxygen and nitrogen. The vaporizer C serves for heat interchange between the preliminary rectifier A and the main rectifier B in order to produce reflux fluids therein.

Before being introduced into pipe 1, see Fig. 1, the air to be rectified is first compressed to a high pressure, 1000 to 2000 lb. gage, purified of moisture and carbon dioxide, and then cooled to say 150 degrees below zero centigrade in apparatus not shown. In passing through coils 2 immersed in the oxygen rich liquid in the pot at the bottom of preliminary rectifier A, the compressed air is further cooled. It is then throttled by valve 3 in pipe 4 before being discharged at 5 into the preliminary rectifier A where the pressure is say 50 lb. gage.

The combined cooling and throttling of the compressed air results in a portion of it being liquid when it is discharged at 5 tangentially into a restricted passage formed by vertical cylinder 6 held in horizontal plate 7. Plate 7 causes all vapor rising from trays 8 below the inlet to pass through cylinder 6, while liquid from trays 9 above the inlet accumulates on plate 7 and flows over the serrated edge of cylinder 6. The tangential entrance of the partly liquefied air causes the vapor and liquid within cylinder 6 to whirl, with the result that the liquid is thrown to the periphery of the vapor where it adheres to the inside of cylinder 6 and runs down thereon. The liquid separated from the entering air is thoroughly mixed with the liquid from trays 9 above the inlet. The vapor portion of the entering air is thoroughly mixed with the vapor rising from trays 8 below the inlet.

This thorough mixture of the liquid and vapor in the entering air with the liquid and vapor from the trays above and below the inlet respectively is conducive to securing high purity of products in any type of rectification column, but it is particularly valuable with the type of tray to be presently described wherein the liquid and vapor flowing from tray to tray are each divided into a number of separate streams. Any inequality in the compositions of the separate streams is eliminated by thoroughly mixing them. It is advantageous to so mix them at other points within the rectifying column as well as at the inlet.

Within cylinder 6, the liquid and vapor are nearly if not quite in phase equilibrium. The liquid therefore contains more oxygen and the vapor contains more nitrogen than in the original atmospheric air. The liquid from cylinder 6 trickles down from tray to tray through all trays 8 below the inlet, coming into contact with vapor rising through these trays. The vapor from cylinder 6 rises from tray to tray through all trays 9 above the inlet, coming into contact with liquid trickling down through these trays. By reason of the reactions which take place between these liquid and vapor streams, nearly pure nitrogen vapor rises from the topmost tray above the inlet and an oxygen rich liquid drips from the lowermost tray below the inlet of preliminary rectifier A.

The oxygen rich liquid accumulates in the pot at the bottom of preliminary rectifier A where it is partly evaporated by heat interchange with the compressed air within coiled tubes 2 at a higher temperature. The vapor rising from this liquid passes up through trays 8 below the inlet, absorbs nitrogen from the down-flowing liquid and gives up oxygen thereto, thereby producing the oxygen rich liquid which drips from the lowermost tray.

The nearly pure nitrogen vapor which rises from the topmost tray of preliminary rectifier A, enters tubes 10 of vaporizer C. Here it is liquefied and drops into preliminary rectifier A. Part of this liquid falls directly onto the topmost tray. The remaining liquid falls into the annular trough between serrated brim 11 and the shell of preliminary rectifier A. Whatever liquid is not withdrawn through pipe 12, overflows brim 11 onto the topmost tray. This nearly pure nitrogen liquid which falls onto the topmost tray of preliminary liquefier A, trickles down from tray to tray through trays 9 above the inlet where it absorbs oxygen from the rising vapor and imparts nitrogen thereto, thus producing the nearly pure nitrogen vapor which rises from the topmost tray of preliminary rectifier A.

The oxygen rich liquid which is not evaporated in the pot at the lower end of preliminary rectifier A, is throttled through pipe 14 by valve 15 into main rectifier B. Since the pressure in main rectifier B is only slightly above atmospheric pressure, part of the liquid is evaporated by throttling. This mixture of liquid and vapor enters at 16 tangentially into cylinder 17 supported by plate 18. This construction at the inlet to main rectifier B is the same as at the inlet to preliminary rectifier A for the same reasons as previously explained for the preliminary rectifier.

Nearly pure nitrogen liquid is throttled through pipe 12 by valve 13 into the annular chamber at the top of main rectifier B. Some of this liquid is vaporized by throttling. The purpose of the construction shown is to separate the vapor from the liquid and conduct the latter to the topmost tray where it serves as a reflux liquid for reducing the oxygen in the vapor rising through trays 19 above the inlet. This nitrogen vapor leaves through pipe 21 as one of the products of rectification.

The liquid trickling down from tray to tray through trays 19, mixes with the entering liquid within cylinder 17 and continues downward through trays 20 below the inlet. It finally leaves the lowermost tray in main rectifier B as nearly pure oxygen liquid. Flowing down through pipe 22, this liquid enters the space surrounding tubes 10 in vaporizer C. Here the nearly pure oxygen liquid is evaporated by heat interchange with the nearly pure nitrogen vapor under a higher pressure within tubes 10. Part of the resulting oxygen vapor is withdrawn through pipe 23 as the other product of rectification. The oxygen vapor not so withdrawn rises through pipe 24 and thence through trays 20 where it serves as a reflux vapor for reducing the nitrogen in the liquid trickling down from tray to tray.

Figure 2:
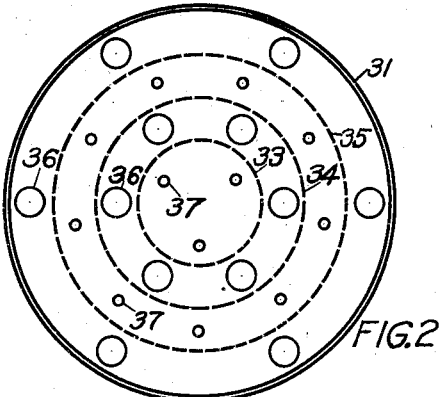
Fig. 2 is a plan view of one of the improved trays used therein.
Figure 3:
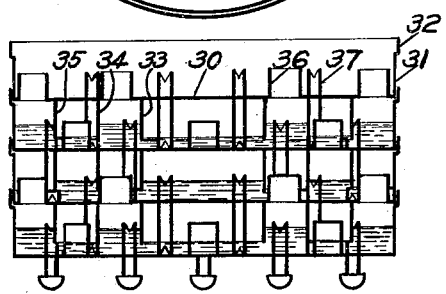
Fig. 3 is a sectional elevation through several trays including the lowermost one.
Figure 4:
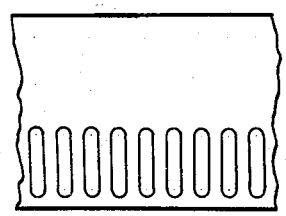
Fig. 4 is a detail view of the perforated skirts used in the tray construction.

The construction of the individual trays 8, 9, 19 and 20 is shown in detail in Figs. 2, 3 and 4. Each tray comprises a substantially horizontal circular plate 30 with upturned edge 31 which is enlarged in diameter near the top 32 for the tray above to rest therein. From the bottom of each tray project a number of concentric skirts 33, 34, 35, which divide the space within the tray below into a series of compartments. Riser tubes 36, open at top and bottom, project through plate 30 from the alternate compartments below the plate. Overflow tubes 37, open at top and bottom and with serrated edges, project through plate 30 into the intervening compartments below the plate.

In the alternate compartments of any one tray, liquid enters through the overflow tubes from the tray above and vapor enters through the riser tubes from the tray below. The only way for this liquid and vapor to leave these alternate compartments is under the skirts projecting down from the tray above or through perforations in these skirts shown in Fig. 4. Accumulation of vapor within these compartments forces the liquid down until the vapor can pass through such perforations or under the serrated edges of the skirts along with the liquid.

The liquid then rises in the intervening compartments until it can enter the notches in the serrated edges of the overflow tubes and flow to the compartments in the tray below. The vapor which passes through the perforations in the skirts or under their serrated edges, must bubble through the liquid in these intervening compartments before it can leave through the riser tubes to the compartments in the tray above.

The overflow tubes for liquid leaving the lowermost tray are sealed with liquid in small cups to prevent vapor rising through these tubes. Each cup is hung from a tube. The riser tubes for vapor passing through the topmost trays are covered by bubbling cups so that liquid will not flow down through these tubes.

By this construction, the cooler liquid from the tray above and the warmer vapor from the tray below are first brought into direct contact so that there is the maximum possible temperature difference for heat interchange between the liquid and the vapor. To facilitate this heat interchange, the vapor and liquid are then passed together through the perforations or under the serrated edges of the skirts projecting down from the tray above. Since the serrated edges of the overflow tubes are above the perforations in the skirts, the vapor must bubble through the liquid before the liquid and the vapor can pass to the trays below and above respectively.

Figure 5:
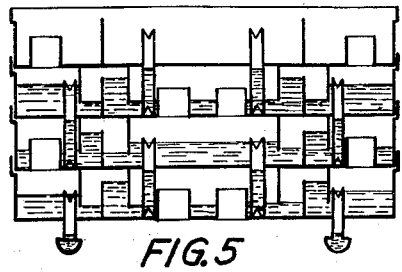
Fig. 5 is a diagrammatic sectional elevation of a modified tray construction carrying the fundamental idea still further.

To insure a still closer approach to temperature equality, and therefore to phase equilibrium, a multiple system of skirts can be provided with intermediate dams as shown diagrammatically in Fig. 5. Here, liquid from the tray above and vapor from the tray below are first brought into direct contact in one compartment. The vapor and liquid then pass together out of this compartment into an adjacent one through perforations in a skirt projecting down from the tray above. A dam rising from the tray in question causes the liquid to rise so that the vapor must bubble through the liquid. After flowing over the dam, the liquid is depressed by the vapor above it until the vapor can escape with the liquid through perforations in a second skirt into a third compartment. Here the liquid must rise in order to overflow into the tray below. Hence the vapor must bubble through the liquid a second time. Any number of skirts and intermediate dams can be provided until the desired approach to phase equilibrium is obtained in each tray. Other constructions might be used to give a tortuous passage for the liquid and vapor in order to approach temperature equality and hence phase equilibrium as closely as possible.

The advantages of the above described construction can be more fully appreciated by describing what takes place in the tray constructions as heretofore used. Each tray is designed to hold a considerable body of liquid through which vapor rising from the tray below bubbles by reason of bubble caps mounted over a number of riser tubes projecting through the tray in question. Liquid flows into one side of the tray in question through a liquid seal from the tray above, then flows across the tray and over a dam which determines the height of liquid on the tray, and from thence flows through another liquid seal onto the tray below.

As there is a considerable body of liquid on each tray, the change in temperature when warmer vapor from the tray below bubbles through the liquid thereon, occurs mainly in the vapor with but little change in the liquid temperature. Also, as the downflow of liquid from tray to tray is not large relative to the amount of liquid on each tray, the cooler liquid from the tray above is heated rather quickly to the tray temperature by direct contact with the body of liquid on the tray. This body of liquid thus has an intermediate temperature between that of the tray above and that of the tray below. The vapor from the tray below is brought into contact with this liquid of intermediate temperature on the tray in question, rather than into direct contact with the liquid from the tray above at a still lower temperature as in the improved construction previously described. Any non-uniformity in the temperature of the liquid on the tray of usual construction further reduces the effectiveness of such trays.

I claim:

1. A rectifier for separating mixed fluids, including a series of trays superimposed one above the other, means for passing liquid and vapor refluxes through said trays, said trays comprising a series of compartments, inlets for liquid from the tray above and for vapor from the tray below into alternate compartments, passages for the flow of liquid and vapor from these alternate compartments into intervening compartments, and outlets for liquid to the tray below and for vapor to the tray above from the intervening compartments.

2. A rectifier for separating mixed fluids, including a series of trays superimposed one above the other, means for passing liquid and vapor refluxes through said trays said trays comprising a series of compartments, means for introducing liquid from the tray above and vapor from the tray below into certain of these compartments, passages for the liquid and vapor to flow from these compartments into other compartments, and means for discharging liquid to the tray below and vapor to the tray above from the last mentioned compartments.

3. A rectifier for separating mixed fluids, including a series of trays superimposed one above the other, means for passing liquid and vapor refluxes through said trays, a restricted passage at an intermediate point in the series of trays through which passage must pass liquid from the trays above and vapor from the trays below, and means for introducing the mixed fluids to be separated tangentially into said restricted passage.

4. A rectifier for separating mixed fluids, including a series of trays superimposed one above the other, means for passing liquid and vapor refluxes through said trays, said trays comprising a substantially horizontal plate, skirts projecting from the bottom of said plate and forming a series of compartments, vapor riser tubes projecting through said plate from alternate compartments, and liquid overflow tubes projecting through said plate into the intervening compartments.

5. A rectifier for separating mixed fluids, including a series of trays superimposed one above the other, means for passing liquid and vapor refluxes through said trays, said trays comprising a substantially horizontal plate, skirts projecting from the bottom of said plate and forming a series of compartments, the said skirts having serrated lower edges or perforations just above the lower edges, vapor riser tubes projecting through said plate from alternate compartments, and liquid overflow tubes projecting through said plate into the intervening compartments.

6. A rectifier for separating mixed fluids, including a series of trays superimposed one above the other, means for passing liquid and vapor refluxes through said trays, said trays comprising a substantially horizontal plate, skirts projecting from the bottom thereof and forming a series of compartments, vapor riser tubes projecting through said plate from alternate compartments, and liquid overflow tubes projecting through said plate into the intervening compartments, the said liquid overflow tubes having serrated edges at their upper ends.

7. A rectifier for separating mixed fluids, including a series of trays superimposed one above the other, means for passing liquid and vapor refluxes through said trays, said trays comprising a substantially horizontal plate, skirts projecting from the bottom of said plate and forming a series of compartments, vapor riser tubes projecting through said plate from alternate compartments, and liquid overflow tubes projecting through said plate into the intervening compartments, the said liquid overflow tubes touching the tray below and having perforations or serrated lower edges for liquid to flow out.

8. A rectifier for separating mixed fluids including a series of trays superimposed one above the other, means for passing liquid and vapor refluxes through said trays, partitions extending down from the bottoms of said trays and dividing the spaces between said trays into a plurality of series of compartments, vapor riser tubes extending through alternate trays from compartment to compartment, liquid overflow tubes extending through intervening trays from compartment to compartment of the same series of compartments, and passages through or under said partitions for flow of mixed liquid and vapor from compartment to compartment.

9. A rectifier for separating mixed fluids including a series of trays superimposed one above the other, means for passing liquid and vapor refluxes through said trays, partitions extending down from the bottoms of said trays and dividing the spaces between said trays into a plurality of series of compartments, vapor riser tubes extending through alternate trays from compartment to compartment of certain series of compartments, liquid overflow tubes extending through intervening trays from compartment to compartment of the same series of compartments, passages through or under said partitions for flow of liquid and vapor from compartment to compartment, additional partitions extending up from the tops of said trays into intermediate series of compartments having no vapor riser tubes or liquid overflow tubes, and passages through or over said additional partitions for flow of mixed liquid and vapor through said compartments.

WILLIAM LANE DE BAUFRE.